United States Patent
Nakatsuka et al.

(10) Patent No.: US 11,459,271 B2
(45) Date of Patent: Oct. 4, 2022

(54) METHOD FOR PRODUCING GLASS PLATE

(71) Applicant: Nippon Electric Glass Co., Ltd., Shiga (JP)

(72) Inventors: Hiroki Nakatsuka, Shiga (JP); Kaoru Mitsugi, Shiga (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 159 days.

(21) Appl. No.: 16/757,487

(22) PCT Filed: Dec. 13, 2018

(86) PCT No.: PCT/JP2018/045905
§ 371 (c)(1),
(2) Date: Apr. 20, 2020

(87) PCT Pub. No.: WO2019/124216
PCT Pub. Date: Jun. 27, 2019

(65) Prior Publication Data
US 2021/0188704 A1    Jun. 24, 2021

(30) Foreign Application Priority Data
Dec. 22, 2017 (JP) ............................. JP2017-246505

(51) Int. Cl.
*C03C 23/00* (2006.01)
*B08B 1/00* (2006.01)
(Continued)

(52) U.S. Cl.
CPC .......... *C03C 23/0075* (2013.01); *B08B 1/002* (2013.01); *B08B 1/006* (2013.01);
(Continued)

(58) Field of Classification Search
None
See application file for complete search history.

(56) References Cited

U.S. PATENT DOCUMENTS

2011/0195279 A1* 8/2011 Saeki .................. B24B 13/0018
428/64.2
2016/0229744 A1* 8/2016 Inayama ............. H01L 51/0096

FOREIGN PATENT DOCUMENTS

CN       1447395       10/2003
CN      102822110      12/2012
(Continued)

OTHER PUBLICATIONS

International Preliminary Report on Patentability and Written Opinion of the International Searching Authority dated Jun. 23, 2020 in International (PCT) Application No. PCT/JP2018/045905. 5 pages.
(Continued)

*Primary Examiner* — Eric W Golightly
(74) *Attorney, Agent, or Firm* — Wenderoth, Lind & Ponack, L.L.P.

(57) ABSTRACT

Provided is a method of manufacturing a glass sheet including a step of bringing a glass sheet (G1, G2) having a first liquid adhering to a surface into contact with a roller (5a, 5b). The glass sheet (G1, G2) includes: a first glass sheet (G1); and a second glass sheet (G2) having a contact length with the roller (5a, 5b) which is larger than that of the first glass sheet (G1). The step of bringing the glass sheet (G1, G2) into contact with the roller (5a, 5b) includes a liquid supplying step of, at the time of bringing the first glass sheet (G1) into contact with the roller (5a, 5b), applying a second liquid to a non-contact portion of the roller (5a, 5b) which is prevented from being brought into contact with the first glass sheet (G1).

18 Claims, 7 Drawing Sheets

(51) Int. Cl.
  *B08B 1/02* (2006.01)
  *B08B 3/04* (2006.01)
  *B08B 11/04* (2006.01)
  *B65H 5/06* (2006.01)

(52) U.S. Cl.
  CPC ............... *B08B 1/02* (2013.01); *B08B 3/041* (2013.01); *B08B 11/04* (2013.01); *B65H 5/06* (2013.01)

(56) References Cited

FOREIGN PATENT DOCUMENTS

| CN | 104708528 | 6/2015 |
| CN | 205676365 | 11/2016 |
| CN | 206485984 | 9/2017 |
| JP | 2003-124285 | 4/2003 |
| JP | 2010-60253 | 3/2010 |
| JP | 2015-30570 | 2/2015 |
| JP | 2016-5987 | 1/2016 |
| JP | 2017-014060 | 1/2017 |
| JP | 2017-113663 | 6/2017 |
| JP | 2017-135305 | 8/2017 |

OTHER PUBLICATIONS

International Search Report dated Feb. 12, 2019 in International (PCT) Application No. PCT/JP2018/045905. One page.
Office Action dated Feb. 18, 2022 in corresponding Chinese Patent Application No. 201880071795.1, with English-language translation. 17 pages.
English-language translation of Search Report dated Feb. 13, 2022 in corresponding Chinese Patent Application No. 201880071795.1. 2 Pages.

* cited by examiner

METHOD FOR PRODUCING GLASS PLATE

TECHNICAL FIELD

The present invention relates to a method of manufacturing a glass sheet including a step of cleaning a glass sheet.

BACKGROUND ART

As is well known, in a process of manufacturing a glass sheet, after end surfaces of a glass sheet having been cut into a predetermined shape are processed by, for example, a grinding and polishing tool, a step of cleaning the glass sheet is performed. For example, in Patent Literature 1, there is disclosed a cleaning apparatus to be used in the cleaning step. The cleaning apparatus includes a conveyance roller pair and a cleaning roller pair. The conveyance roller pair includes an upper conveyance roller and a lower conveyance roller, which are configured to convey the glass sheet while nipping the glass sheet therebetween. The cleaning roller pair includes an upper cleaning roller and a lower cleaning roller, which are configured to perform rubbing cleaning on surfaces of the glass sheet while vertically nipping the glass sheet therebetween.

The cleaning apparatus includes the conveyance roller pair and the cleaning roller pair which are arranged side by side in a conveyance direction of the glass sheet, and is configured to clean the glass sheet with the cleaning roller pair while conveying the glass sheet with the conveyance roller pair.

In Patent Literature 2, there is disclosed a cleaning apparatus configured to clean a glass sheet with a plurality of cleaning pads (cleaning members) each having a disc shape. The cleaning apparatus nips the glass sheet, which is conveyed in a horizontal posture, between upper cleaning pads and lower cleaning pads and rotates the cleaning pads to clean an upper surface and a lower surface of the glass sheet.

CITATION LIST

Patent Literature 1: JP 2017-113663 A
Patent Literature 2: JP 2017-14060 A

SUMMARY OF INVENTION

Technical Problem

In the related-art cleaning apparatus described above, in some cases, a plurality of kinds of glass sheets are changed over and cleaned. For example, in a case of cleaning a plurality of kinds of glass sheets having different sizes, a range of a portion in which the conveyance rollers and the cleaning rollers are brought into contact with the glass sheet differs. Specifically, each of the rollers has a portion which is to be brought into contact with a glass sheet having a large size but is prevented from being brought into contact with a glass sheet having a small size (hereinafter such portion is referred to as "non-contact portion").

The non-contact portion is prevented from being brought into contact with the glass sheet having a small size during conveyance, and hence is more liable to dry. When the non-contact portion dries, fine particles such as glass powder included in an atmosphere around the rollers firmly adhere to a surface of the non-contact portion in the cleaning step. That is, even when the fine particles in the atmosphere firmly adhere to the portion of each of the rollers which is brought into contact with the glass sheet, the fine particles can be washed away by a flow of water such as cleaning liquid having been absorbed from the glass sheet. However, such water is not present at the non-contact portion, and hence fine particles remain firmly adhering to the surface of the non-contact portion.

Under a state in which fine particles firmly adhere to the non-contact portion of the roller as described above, when cleaning is changed over from cleaning of a glass sheet having a small size to cleaning of a glass sheet having a large size, the fine particles are brought into contact with a surface of the glass sheet having a large size. Thus, there is a fear in that quality abnormality such as contamination or damage on the surfaces of the glass sheet occurs due to the contact with the fine particles described above.

In order to prevent such quality abnormality, it is conceivable to convey a dummy glass sheet before cleaning of a glass sheet having a large size so that the fine particles adhering to the rollers are caused to adhere to the dummy glass sheet.

However, this method requires a long time to remove fine particles from the rollers, and hence there is a fear in that manufacturing efficiency for the glass sheets is significantly degraded.

Also with regard to the cleaning apparatus of Patent Literature 2, when glass sheets having different sizes are cleaned with a plurality of pairs of the cleaning pads, each of the cleaning pads has a portion which is to be brought into contact with a glass sheet having a large size but is prevented from being brought into contact with a glass sheet having a small size (non-contact portion). Thus, similarly to the case of the rollers, there is a fear in that quality abnormality such as contamination or damage on the surface of the glass sheet occurs.

The present invention has been made in view of the above-mentioned circumstances, and has an object to provide a method of manufacturing a glass sheet capable of preventing occurrence of quality abnormality on a surface of a glass sheet when glass sheets having different contact lengths are brought into contact with rollers. Further, the present invention has an object to provide a method of manufacturing a glass sheet capable of preventing occurrence of quality abnormality on a surface of a glass sheet when glass sheets having different contact lengths are brought into contact with cleaning pads.

Solution to Problem

The present invention has been made to solve the above-mentioned problems, and there is provided a method of manufacturing a glass sheet comprising a step of bringing a glass sheet having a first liquid adhering to a surface thereof into contact with a roller, wherein the glass sheet comprises: a first glass sheet; and a second glass sheet having a contact length with the roller which is larger than that of the first glass sheet, and wherein the step of bringing the glass sheet into contact with the roller comprises a liquid supplying step of, at the time of bringing the first glass sheet into contact with the roller, applying a second liquid to a non-contact portion of the roller which is to be brought into contact with the second glass sheet and is prevented from being brought into contact with the first glass sheet.

With the configuration described above, the second liquid is supplied to the non-contact portion of the roller which is prevented from being brought into contact with the first glass sheet during conveyance of the first glass sheet having a smaller contact length with the roller. Thus, fine particles which adhere to the non-contact portion can be removed by the liquid. With this, fine particles are prevented from firmly adhering to a surface of the non-contact portion, and hence, at the time of bringing the second glass sheet having a larger contact length into contact with the roller, occurrence of quality abnormality on the surface of the glass sheet due to contact with fine particles can be prevented.

It is desired that the step of bringing the roller into contact with the glass sheet comprise a step of cleaning the glass sheet while conveying the glass sheet. The cleaning step is a step for removing dust and the like which adhere to the glass sheet. When the present invention is applied to a roller used in the cleaning step, occurrence of quality abnormality on the glass sheet due to contact with fine particles can be efficiently prevented.

In the method of manufacturing a glass sheet described above, it is desired that the roller comprise a squeezing roller configured to remove the first liquid. The non-contact portion of the squeezing roller is more liable to dry, and hence fine particles are more liable to adhere to the non-contact portion of the squeezing roller. Therefore, quality abnormality due to fine particles which adhere to the non-contact portion of the squeezing roller is more liable to occur. However, through the supply of the second liquid to the squeezing roller in the liquid supplying step, occurrence of quality abnormality on the glass sheet due to contact with fine particles can be efficiently prevented.

In addition, it is desired that the roller comprise an upper roller and a lower roller configured to convey the glass sheet while vertically nipping the glass sheets therebetween. Through nipping of the glass sheet by the upper and lower rollers, the glass sheet can be suitably conveyed without causing quality abnormality on both front and back surfaces of the glass sheet. In this case, it is desired that the liquid be dropped from a position above the upper roller. Through dropping of the liquid from the position above the upper roller, the liquid is supplied also to the lower roller through the upper roller. Thus, fine particles which adhere to non-contact portions of the both rollers can be removed by the liquid.

In addition, it is desired that, in the step of bringing the roller into contact with the glass sheet, the glass sheet be brought into contact with the roller in an inclined posture, and the non-contact portion be set on a higher side of the roller which is inclined along the glass sheet. With this, the first liquid which adheres to the surface of the glass sheet flows downward along the inclination of the glass sheet and can be dropped (removed) from the glass sheet. Further, through setting of the non-contact portion of the roller on the higher side of the inclined roller, as compared to a case of setting the non-contact portions on both of the higher side and a lower side of the roller, installation cost can be reduced.

The present invention has been made to solve the above-mentioned problems, and there is provided a method of manufacturing a glass sheet comprising a cleaning step of bringing a glass sheet into contact with a plurality of cleaning pads arranged in a direction of intersecting a conveyance direction of the glass sheet while conveying the glass sheet having a first liquid adhering to a surface thereof, wherein the glass sheet comprises: a first glass sheet; and a second glass sheet having a larger number of the plurality of cleaning pads to be brought into contact therewith than that of the first glass sheet, and wherein the cleaning step comprises a liquid supplying step of, at a time of bringing the first glass sheet into contact with the plurality of cleaning pads, applying a second liquid to a cleaning pad among the plurality of cleaning pads which is brought into contact with the second glass sheet and is prevented from being brought into contact with the first glass sheet.

With the configuration described above, the second liquid is supplied to the cleaning pad (non-contact cleaning pad) which is prevented from being brought into contact with the first glass sheet during conveyance of the first glass sheet having a smaller number of the cleaning pads to be brought into contact therewith. Thus, fine particles which adhere to the non-contact cleaning pad can be removed by the liquid. With this, fine particles are prevented from firmly adhering to a surface of the non-contact cleaning pad, and hence, when the second glass sheet having a larger number of cleaning pads to be brought into contact therewith is brought into contact with the cleaning pads, occurrence of quality abnormality on surface of the glass sheet due to contact with fine particles can be prevented.

The cleaning pads may comprise an upper cleaning pad and a lower cleaning pad configured to vertically nip the glass sheet therebetween. Through nipping of the glass sheet by the upper and lower cleaning pads, the glass sheet can be suitably cleaned without causing quality abnormality on both the front and back surfaces of the glass sheet.

Advantageous Effects of Invention

According to the present invention, when glass sheets having different contact lengths are brought into contact with a roller, occurrence of quality abnormality on surfaces of the glass sheets can be prevented. Further, according to the present invention, when glass sheets having different contact lengths are brought into contact with cleaning pads, occurrence of quality abnormality on surfaces of the glass sheets can be prevented.

DESCRIPTION OF EMBODIMENTS

Embodiments of the present invention are described below with reference to the drawings. FIG. 1 to FIG. 5 are illustrations for illustrating a method of manufacturing a glass sheet according to a first embodiment of the present invention.

Figure 1:
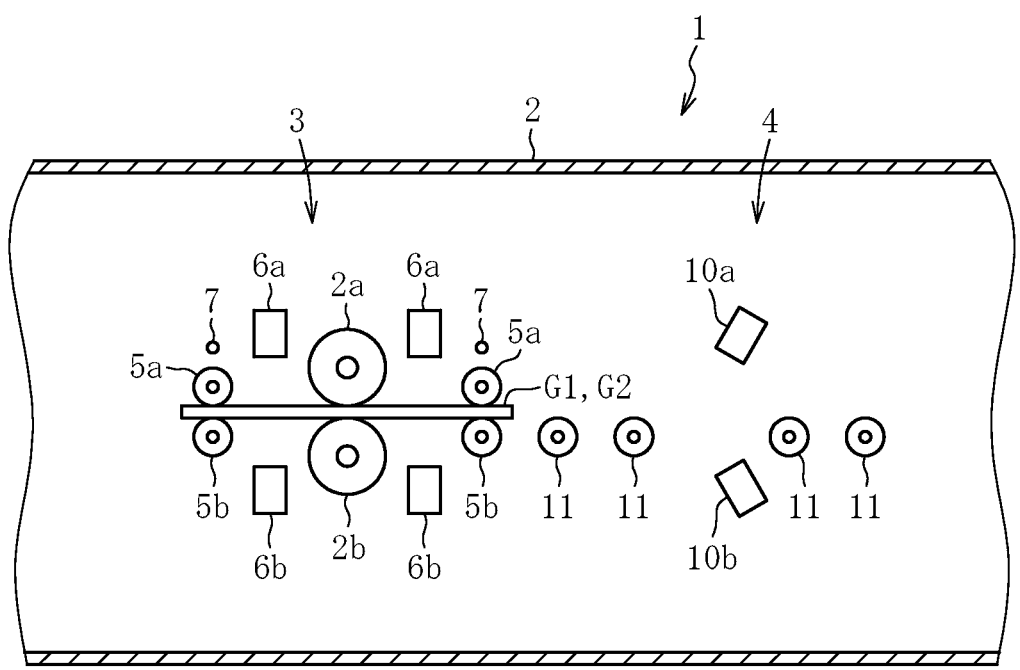
FIG. 1 is a side view for illustrating a cleaning apparatus of a first embodiment of the present invention.
Figure 2A:
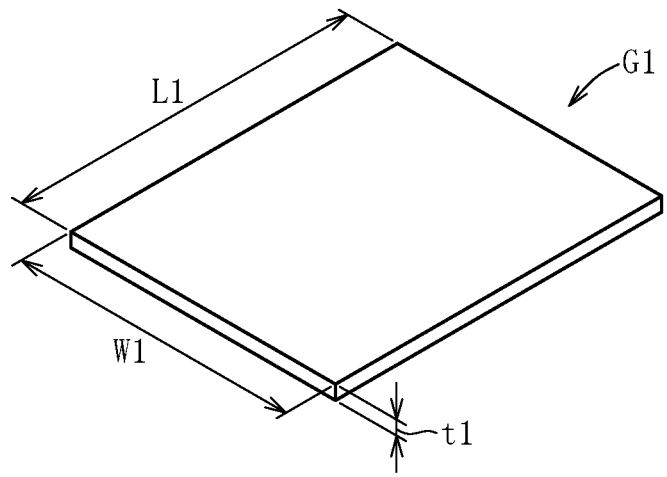
FIG. 2A is a perspective view for illustrating a first glass sheet manufactured by the present invention.
Figure 2B:
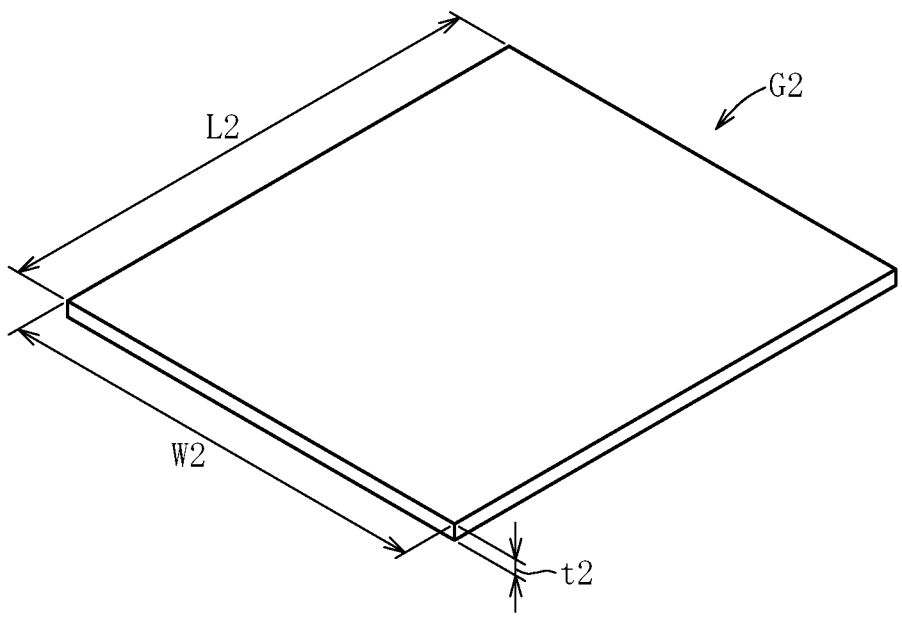
FIG. 2B is a perspective view for illustrating a second glass sheet manufactured by the present invention.

FIG. 1 is an illustration of a cleaning apparatus 1 for a glass sheet. The cleaning apparatus 1 is capable of cleaning a plurality of kinds of glass sheets G1 and G2 having different sizes, thicknesses, materials, and the like. The glass sheets G1 and G2 each serving as an object to be cleaned (object to be produced) are made of, for example, silicate glass or silica glass, and are preferably made of borosilicic acid glass, soda lime glass, aluminosilicate glass, chemically strengthened glass, or alkali-free glass. The "alkali-free glass" as used herein refers to a glass substantially free of an alkaline component (alkali metal oxide), and specifically refers to a glass having a weight ratio of an alkaline component of 3,000 ppm or less. In the present invention, the weight ratio of the alkaline component is preferably 1,000 ppm or less, more preferably 500 ppm or less, most preferably 300 ppm or less.

As illustrated in FIG. 1, the cleaning apparatus 1 comprises a processing chamber 2, a cleaning unit 3, and a drying unit 4. The cleaning unit 3 comprises rollers (hereinafter referred to as "cleaning rollers") 2a and 2b capable of performing rubbing cleaning on the glass sheets G1 and G2. The cleaning rollers 2a and 2b are formed of brush rollers, but may be sponge rollers. The cleaning rollers 2a and 2b are not limited to rollers, and may be disc-shaped cleaning pads formed of, for example, nonwoven fabric or sponge, or may be other cleaning tools.

The cleaning rollers 2a and 2b are formed as a pair of upper and lower rollers and comprises an upper cleaning roller 2a and a lower cleaning roller 2b. One pair of cleaning rollers 2a and 2b is illustrated in FIG. 1. However, the number of the pair of cleaning rollers 2a and 2b is not limited to one, and a plurality of pairs of cleaning rollers 2a and 2b may be arranged. During cleaning, liquid such as cleaning liquid or rinsing liquid are supplied to or discharged from surfaces of each of the glass sheets G1 and G2.

In order to supply or discharge the liquid, the cleaning unit 3 comprises rollers (hereinafter referred to as "squeezing rollers") 5a and 5b, cleaning liquid supply portions 6a and 6b, and liquid supply portions 7. The squeezing rollers 5a and 5b are configured to remove the liquid which adheres to the glass sheets G1 and G2. The cleaning liquid supply portions 6a and 6b are configured to supply liquid to the glass sheets G1 and G2. The liquid supply portions 7 are configured to supply liquid to a part of each of the squeezing rollers 5a and 5b.

Figure 3:
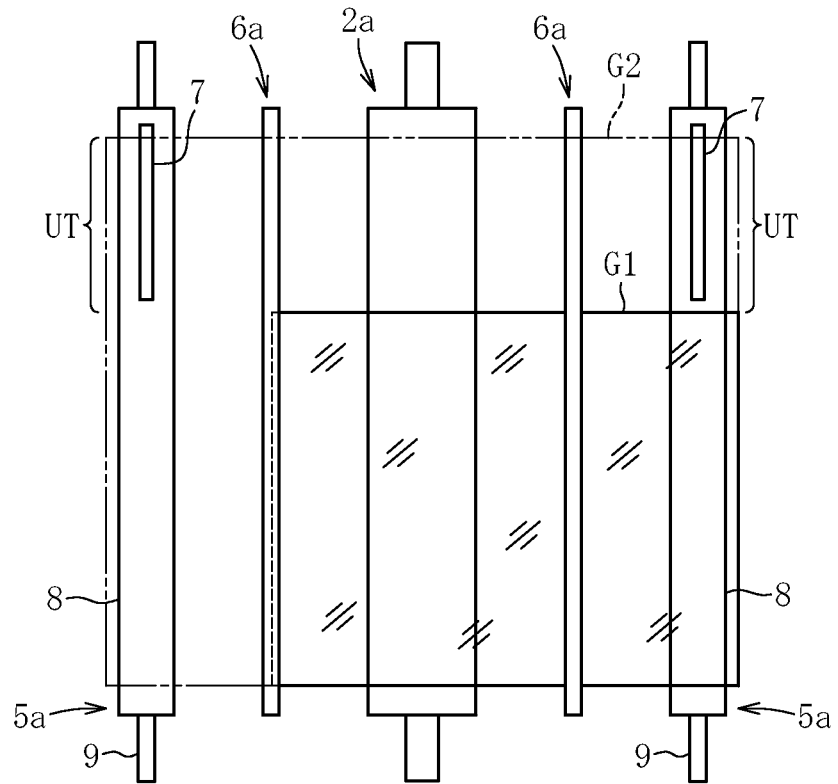
FIG. 3 is a plan view for illustrating a cleaning unit of the cleaning apparatus.

The squeezing rollers 5a and 5b are formed of rollers which are made of a material capable of absorbing liquid (for example, soft sponge), but the squeezing rollers 5a and 5b are not limited to such rollers. The squeezing rollers 5a and 5b are formed of a pair of upper and lower rollers which comprise an upper roller 5a and a lower roller 5b. As illustrated in FIG. 1 and FIG. 3, a plurality of pairs of squeezing rollers 5a and 5b are provided in the cleaning unit 3 and are arranged apart from each other in a horizontal direction.

Figure 4:
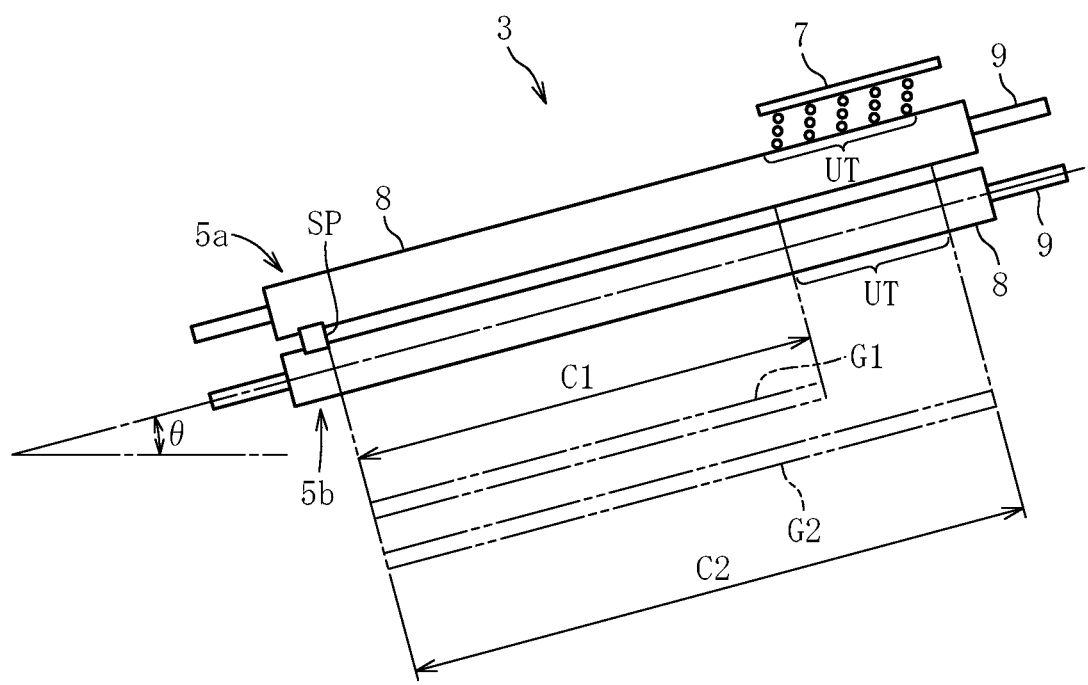
FIG. 4 is a rear view for illustrating squeezing rollers of the cleaning unit.

As illustrated in FIG. 4, in rear view, the squeezing rollers 5a and 5b are inclined by a predetermined angle θ with respect to the horizontal direction orthogonal to a conveyance direction of the glass sheets G1 and G2. The inclination angle θ of the squeezing rollers 5a and 5b can be changed. It is desired that the inclination angle θ of the squeezing rollers 5a and 5b be set within a range of from 1° to 10°.

As illustrated in FIG. 4, a reference position SP for accurate conveyance of the glass sheets G1 and G2 is set on the squeezing rollers 5a and 5b. The reference position SP is set by, for example, a marker provided to the squeezing rollers 5a and 5b or a sensor arranged at a position in the vicinity of the squeezing rollers 5a and 5b. The glass sheets G1 and G2 are arranged so that one end portion of each of the glass sheets G1 and G2 in a width direction matches with the reference position SP. The glass sheets G1 and G2 are conveyed by the squeezing rollers 5a and 5b with positions thereof being regulated.

The squeezing rollers 5a and 5b each comprise a contact portion 8 and a shaft portion 9. The contact portions 8 are brought into contact with the glass sheets G1 and G2. The shaft portions 9 are configured to support the contact portions 8, respectively. The contact portions 8 are each formed of, for example, a foamed resin molded body, a foamed rubber molded body (foam sponge), or a felt-like fiber molded body (felt sponge) so as to have a cylindrical shape. When the contact portions 8 are each formed of a foamed resin molded body, for example, a 30% compression stress of the foamed resin molded body can be set within a range of from 1 kPa to 50 kPa. Further, when the contact portions 8 are each formed of a foamed rubber molded body or a felt-like fiber molded body, for example, Asker C hardness of the foamed rubber molded body or the felt-like fiber molded body can be set within a range of from 1 to 40. The shaft portions 9 are each formed of, for example, a bar-like member made of a metal, and pass through an inside of the contact portions 8, respectively. The shaft portions 9 are each coupled to a drive device (not shown), and are driven to rotate by the drive device.

The cleaning liquid supply portions 6a and 6b comprise a first cleaning liquid supply portion 6a and a second cleaning liquid supply portion 6b. The first cleaning liquid supply portion 6a is arranged on an upper side with respect to the squeezing rollers 5a and 5b. The second cleaning liquid supply portion 6b is arranged on a lower side with respect to the squeezing rollers 5a and 5b. The first cleaning liquid supply portion 6a is configured to discharge cleaning liquid toward the lower side to supply the cleaning liquid to an upper surface of each of the glass sheets G1 and G2. The second cleaning liquid supply portion 6b is configured to jet the cleaning liquid toward the upper side to supply the cleaning liquid to a lower surface of each of the glass sheets G1 and G2.

A plurality of pairs (two pairs in the illustrated example) of the cleaning liquid supply portions 6a and 6b are provided in the cleaning unit 3 and are arranged apart from each other in the horizontal direction. However, the number of the cleaning liquid supply portions 6a and 6b is suitably set depending on conditions such as a scale of the cleaning apparatus 1 and sizes of the glass sheets G1 and G2. The cleaning liquid supply portions 6a and 6b are arranged, between the squeezing rollers 5a and 5b on an upstream side and the squeezing rollers 5a and 5b on a downstream side, on the upstream side of the cleaning rollers 2a and 2b and on the downstream side of the cleaning rollers 2a and 2b, respectively.

The liquid supply portions 7 each have a tubular shape and comprise a plurality of holes (discharge port), which are arranged apart from each other in a longitudinal direction of the liquid supply portion 7 and are configured to discharge liquid. The liquid supply portions 7 are configured to discharge, for example, water, but the liquid is not limited to water. The liquid supply portions 7 are arranged on the upper side with respect to the upper rollers 5a, respectively. Each of the liquid supply portions 7 is configured to supply the liquid only to a certain region of the contact portion 8 of the upper roller 5a on one end portion side. The liquid supply portion 7 drops (dispenses dropwise) the liquid through the plurality of holes to supply the liquid to the contact portion 8 of the upper roller 5a. The liquid supply portions 7 are configured to supply the liquid at a flow rate of, for example, from 1 L/min to 10 L/min per contact length of 100 mm.

The cleaning apparatus 1 of this embodiment comprises only one cleaning unit 3. However, the cleaning apparatus 1 may comprise a plurality of cleaning units 3. When the cleaning apparatus 1 comprises the plurality of cleaning units 3, it is only required that the cleaning units 3 be arranged side by side so as to allow the glass sheets G1 and G2 to sequentially pass through the plurality of cleaning units 3.

The drying unit 4 comprises air knives 10a and 10b and a plurality of conveyance rollers 11. The air knives 10a and 10b comprise a first air knife 10a and a second air knife 10b. The first air knife 10a is arranged on the upper side with respect to the conveyance rollers 11. The second air knife 10b is arranged on the lower side with respect to the conveyance rollers 11. The conveyance rollers 11 are arranged apart from each other in the horizontal direction.

In the drying unit 4, the air knives 10a and 10b each jets high-pressure gas to the surfaces (upper surface and lower surface) of each of the glass sheets G1 and G2 while the conveyance rollers 11 convey the glass sheets G1 and G2, to thereby remove water which adheres to the surfaces. The drying unit 4 is not limited to the air knives 10a and 10b, and the glass sheets G1 and G2 may be dried by other publicly-known drying means.

The first glass sheet G1 and the second glass sheet G2 are fed to the cleaning apparatus 1 described above. The second glass sheet G2 is different from the first glass sheet G1 in contact length with the cleaning rollers 2a and 2b, the squeezing rollers 5a and 5b, and the conveyance rollers 11. In this embodiment, description is made of an example in which the first glass sheet G1 having a small size and the second glass sheet G2 having a large size are sequentially fed to the cleaning apparatus 1. As illustrated in FIG. 4, a contact length C1 of the first glass sheet G1 with rollers is smaller than a contact length C2 of the second glass sheet G2 with rollers. In this embodiment, a width W1 of the first glass sheet G1 illustrated in FIG. 2A corresponds to the contact length C1 with rollers, and a width W2 of the second glass sheet G2 illustrated in FIG. 2B corresponds to the contact length C2 with rollers. Further, a length L1 of the first glass sheet G1 is smaller than a length L2 of the second glass sheet G2. The glass sheets G1 and G2 each have a size of, for example, from 1000×1000 mm to 3000×3000 mm. The glass sheets G1 and G2 each have a thickness t1 and t2 which are, for example, from 0.1 mm to 1.0 mm.

Figure 5:
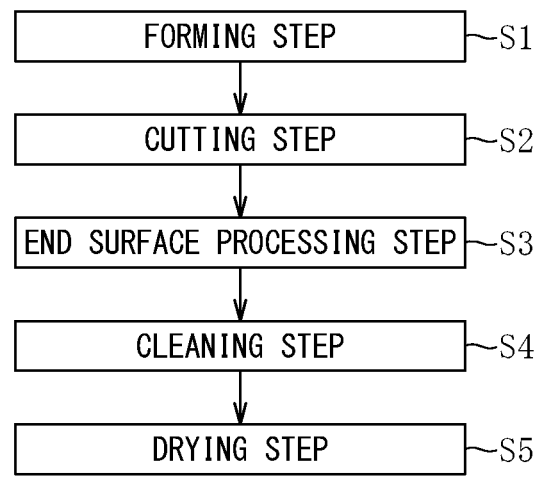
FIG. 5 is a flow chart for illustrating a method of manufacturing a glass sheet.

Now, description is made of a method of manufacturing the glass sheets G1 and G2 through use of the cleaning apparatus 1 having the above-mentioned configuration. The method mainly comprises, as illustrated in FIG. 5, a forming step S1, a cutting step S2, an end surface processing step S3, a cleaning step S4, and a drying step S5.

A float method, a roll-out method, a slot down-draw method, a redraw method, and the like, which have hitherto been known, may be used in the forming step S1, but the glass sheet is preferably formed by an overflow down-draw method. The overflow down-draw method is a method in which a molten glass is poured into an overflow groove provided on an upper portion of a forming body having a substantially wedge cross section, and the molten glasses overflowing from the overflow groove to both sides are caused to flow down along side wall portions of the forming body on both sides to be fused and integrated with each other at the lower end of the forming body, to thereby continuously form a sheet of glass sheet having a belt-like shape.

In the cutting step S2, a glass sheet having a belt-like shape is cut to a predetermined length through use of a cutting device, to thereby obtain a glass sheet having a sheet-shape. The glass sheet thus obtained is further cut, and both end portions in a width direction are removed. In the cutting step S2, the glass sheet in which both end portions in the width direction have been removed is further cut as required. With this, one or a plurality of glass sheets having a desired dimension are obtained from one glass sheet. The cutting described above can be performed by, for example, scribe cutting. In the scribe cutting, a scribing wheel is caused to travel along a preset cutting line which is set on the glass sheet to engrave a scribing line having a predetermined depth on the glass sheet along the preset cutting line. After that, bending moment is applied to the glass sheet such that the bending moment is applied over the scribing line, and then the glass sheet is snapped along the scribing line. The cutting step S2 is not limited to the scribe cutting, and a glass substrate can be cut by laser cleaving, laser fusing, or other cutting method.

In the end surface processing step S3, end surfaces of the glass sheets G1 and G2, each formed into a rectangular shape in the cutting step S2, are subjected to, for example, grinding (chamfering) through use of a grinding grinder and polishing through use of a polishing grinder. When the glass sheets G1 and G2 have a rectangular shape, end surfaces that correspond to four sides are subjected to grinding and polishing. In the end surface processing, liquid such as grinding liquid is supplied to the grinding grinder and liquid such as polishing liquid is supplied to the polishing grinder. Further, liquid such as cleaning liquid is supplied to a surface plate configured to retain the glass sheets G1 and G2. Thus, liquid adheres to the surfaces of the glass sheets G1 and G2, respectively.

In the cleaning step S4, the glass sheets G1 and G2 subjected to the end surface processing step S3 are introduced to an inside of the cleaning apparatus 1. The cleaning apparatus 1 allows the glass sheets G1 and G2 to sequentially pass through the cleaning unit 3 and the drying unit 4. In the following, description is made of a case in which a predetermined number of second glass sheets G2 (for example, 200 or more) are cleaned after a predetermined number of first glass sheets G1 (for example, 200 or more) are cleaned.

In the cleaning step S4, cleaning of the first glass sheet G1 is performed in the cleaning unit 3 (first cleaning step). In the cleaning unit 3, the first glass sheet G1 is conveyed by the plurality of pairs of squeezing rollers 5a and 5b while the liquid is applied to the upper surface and the lower surface of the first glass sheet G1. Both surfaces of the first glass sheet G1 being conveyed are subjected to rubbing cleaning along with rotation of the cleaning rollers 2a and 2b. In this embodiment, the plurality of pairs of squeezing rollers 5a and 5b rotate in a direction of feeding the first glass sheet G1. Further, the cleaning rollers 2a and 2b rotate in such a direction to hider the feeding of the first glass sheet G1. The cleaning rollers 2a and 2b may rotate in the direction of feeding the first glass sheet G1.

The liquid applied to both surfaces of the first glass sheet G1 moves downward along an inclination direction of the first glass sheet G1, and is dropped from an end portion of the first glass sheet G1 to be removed. Further, the liquid applied to both surfaces of the first glass sheet G1 is also removed through absorption by the squeezing rollers 5a and 5b.

At the same time, in the cleaning unit 3, the liquid supply portions 7 supply liquid (for example, water) to a part of the squeezing rollers 5a and 5b (hereinafter referred to as "liquid supplying step"). In the liquid supplying step, the liquid (water) is dropped from the liquid supply portions 7 to the contact portions 8 of the upper rollers 5a among the squeezing rollers 5a and 5b (see FIG. 4). With this, the liquid (for example, water) is supplied to portions (non-contact portions) UT of the contact portions 8 which are prevented from being brought into contact with the first glass sheet G1. In such a manner, fine particles which adhere to the non-contact portions UT of the upper rollers 5a are washed away by the liquid. Part of the liquid supplied to the contact portions 8 of the upper rollers 5a is dropped and moves to the contact portions 8 of the lower rollers 5b. With this, the liquid is supplied also to the non-contact portions UT of the lower rollers 5b. In such a manner, fine particles which adhere to the non-contact portions UT of the lower rollers 5b are also suitably washed away by the liquid. In this embodiment, the term "non-contact portion" refers to a portion which is prevented from being brought into contact with the first glass sheet G1 having a small size but is brought into contact with the second glass sheet G2 having a large size.

The first glass sheet G1 which has passed through the cleaning unit 3 in the above-mentioned manner is moved to the drying unit 4. In the drying step S5, the air knives 10a and 10b each sprays high pressure gas to both surfaces (upper surface and lower surface) of the first glass sheet G1 while the conveyance rollers 11 convey the first glass sheet G1 having passed through the cleaning unit 3 and introduced to the drying unit 4. With this, the liquid that remains on the first glass sheet G1 is removed. Through the above-mentioned steps S1 to S5, a predetermined number of first glass sheets G1 are manufactured.

After cleaning of a predetermined number of first glass sheets G1 is terminated, cleaning of the second glass sheets G2 is performed (second cleaning step). Similarly to the first glass sheet G1, the second glass sheet G2 is introduced to the cleaning apparatus 1 after the forming step S1, the cutting step S2, and the end surface processing step S3. The second glass sheet G2 is cleaned, similarly to the first glass sheet G1, in the cleaning step S4. When the cleaning step S4 is terminated, the drying step S5 is performed on the second glass sheet G2. Through the above-mentioned steps S1 to S5, a predetermined number of second glass sheets G2 are manufactured. In the second cleaning step for the second glass sheet G2, the liquid supplying step (supplying liquid to the non-contact portions UT) is not required to be performed, but the liquid supplying step may be performed.

According to the method of manufacturing glass sheets G1 and G2 in the embodiment described above, the liquid is supplied from the liquid supply portions 7 to respective parts (non-contact portions UT) of the squeezing rollers 5a and 5b which are prevented from being brought into contact with the first glass sheet G1 during conveyance of the first glass sheets G1 having a small size. In such a manner, fine particles which adhere to the non-contact portions UT can be washed away. As a result, contamination of the squeezing rollers 5a and 5b due to fine particles firmly adhering to surfaces of the non-contact portions UT can be prevented. Therefore, the second glass sheet G2 can be suitably conveyed without causing quality abnormality on surfaces of the second glass sheet G2. Further, it is not required to convey a dummy glass sheet before conveyance of a glass sheet having a large size. Thus, degradation in manufacturing efficiency does not occur.

Figure 6:
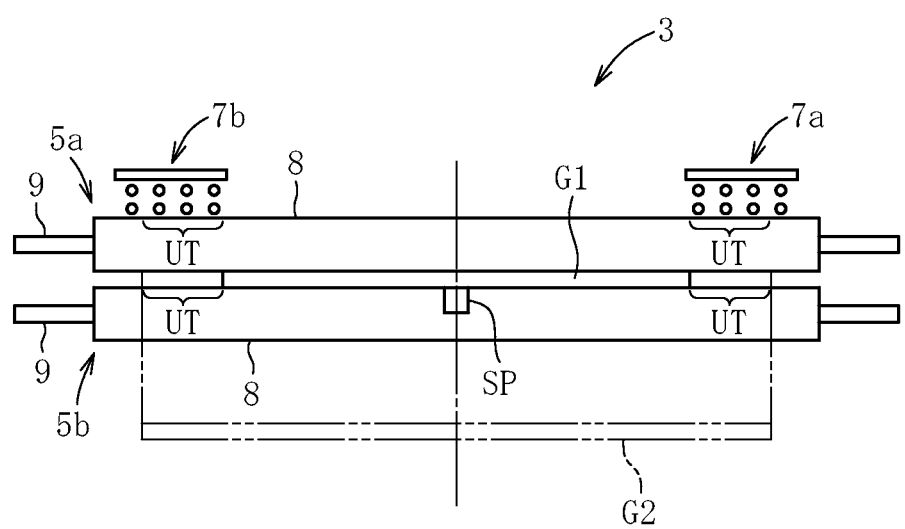
FIG. 6 is a rear view for illustrating squeezing rollers of a cleaning apparatus of a second embodiment.

FIG. 6 is an illustration of the cleaning apparatus 1 of a second embodiment. The squeezing rollers 5a and 5b in the cleaning unit 3 of the cleaning apparatus 1 take a horizontal posture and is configured to convey the glass sheets G1 and G2 at a center portion of the contact portion 8. The cleaning unit 3 comprises two liquid supply portions 7a and 7b. The liquid supply portions 7a and 7b are arranged at positions above the contact portions 8 on one end portion side and at positions above the contact portions 8 on another end portion side, respectively. In this embodiment, a reference position SP for the glass sheets G1 and G2 is set at a center position in a longitudinal direction of the contact portions 8, and a center portions of the first glass sheet G1 and a center portion of the second glass sheet G2 in the width direction are positioned at the reference position SP. In this embodiment, similarly to the first embodiment illustrated in FIG. 1 to FIG. 5, the first cleaning step and the second cleaning step are performed in the cleaning step S4. In the first cleaning step, at the time of cleaning the first glass sheet G1, liquid is supplied from the liquid supply portions 7a and 7b to the non-contact portions UT.

Figure 7:
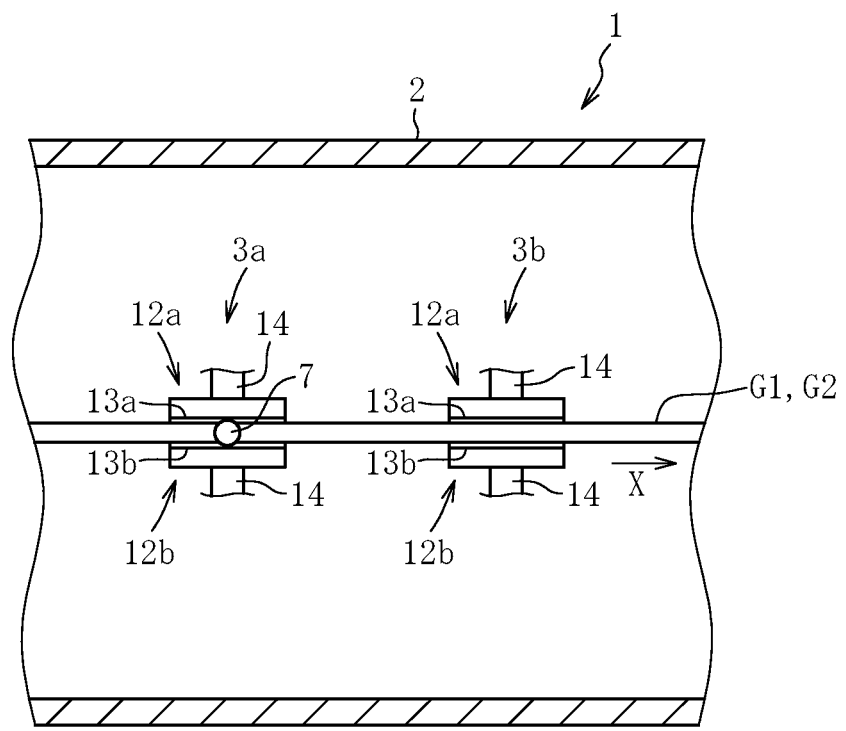
FIG. 7 is a side view for illustrating a cleaning apparatus of a third embodiment.
Figure 8:
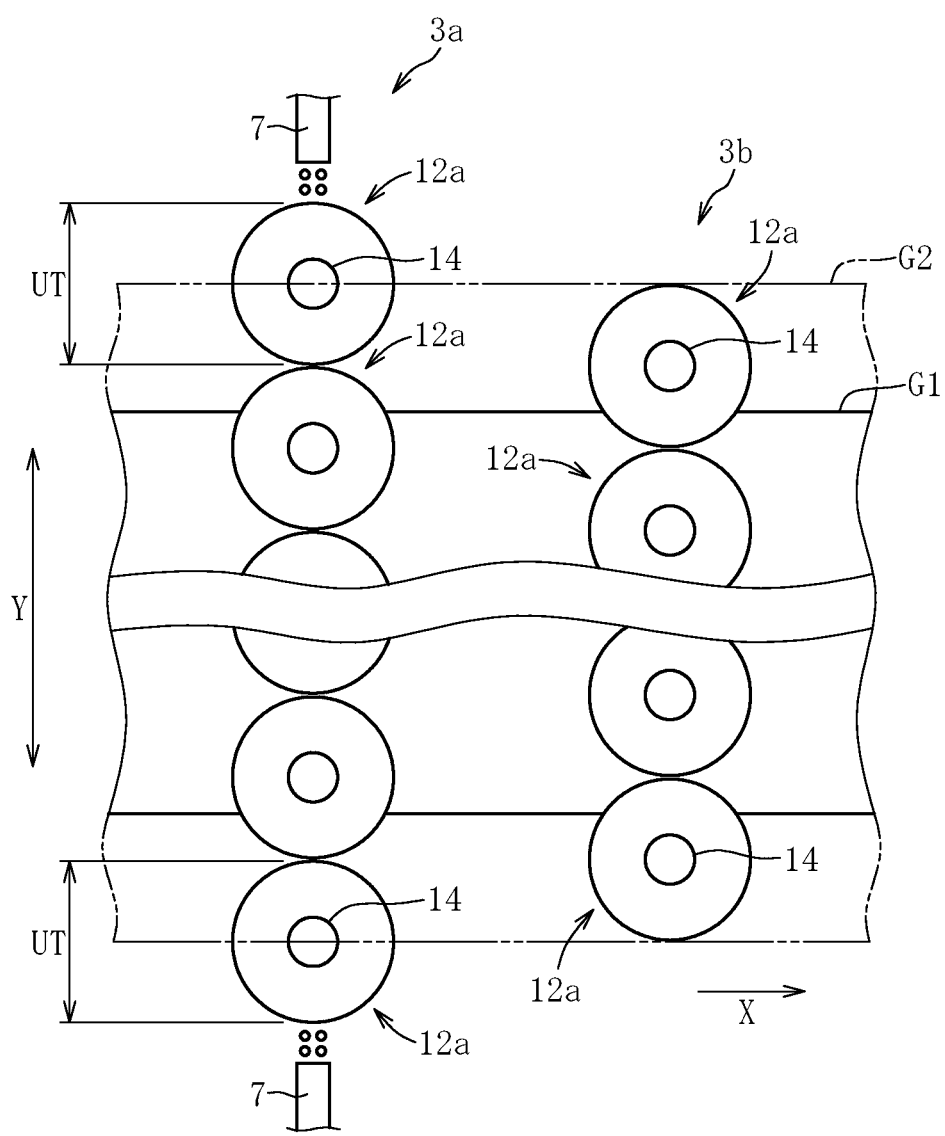
FIG. 8 is a plan view for illustrating a first cleaning unit and a second cleaning unit of the cleaning apparatus.
Figure 9:
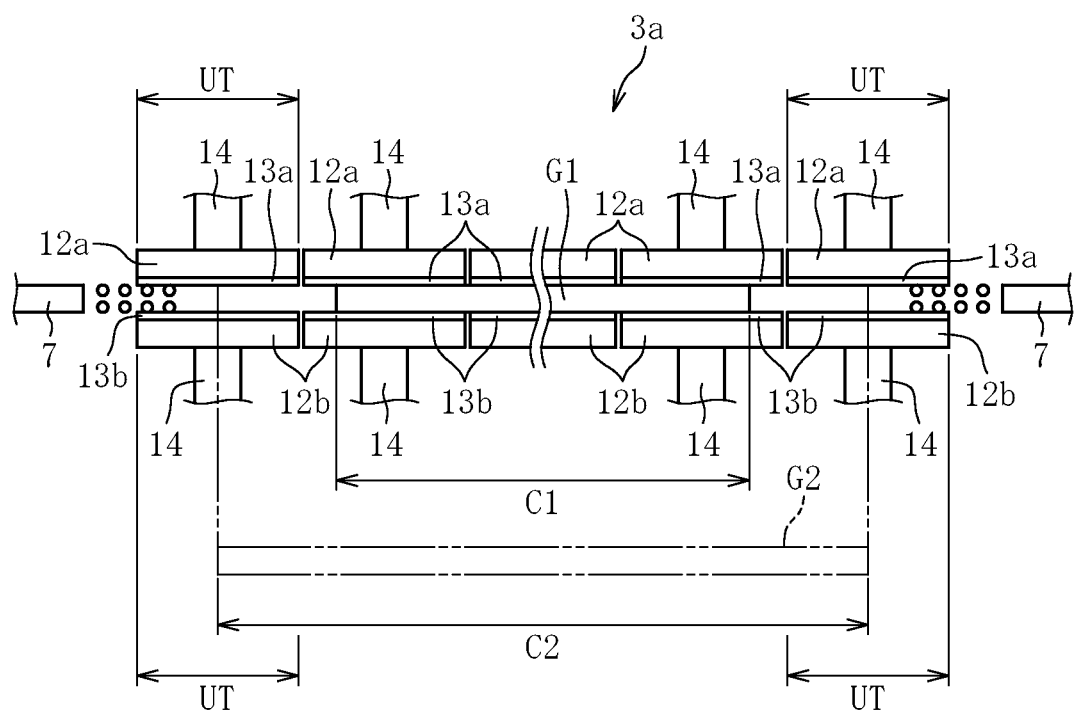
FIG. 9 is a rear view for illustrating cleaning pads in the first cleaning unit.

FIG. 7 to FIG. 9 are illustrations of the cleaning apparatus 1 of a third embodiment. As illustrated in FIG. 7, the cleaning apparatus 1 of this embodiment comprises a first cleaning unit 3a and a second cleaning unit 3b. The first cleaning unit 3a is provided on an upstream side in a conveyance direction X of the glass sheets G1 and G2. The second cleaning unit 3b is provided on a downstream side in the conveyance direction X of the glass sheets G1 and G2.

As illustrated in FIG. 8 and FIG. 9, the first cleaning unit 3a and the second cleaning unit 3b are each formed of a plurality of cleaning heads 12a and 12b which are respectively arranged in a row. The number of cleaning heads 12a and 12b in the first cleaning unit 3a is larger than the number of cleaning heads 12a and 12b in the second cleaning unit 3b. The plurality of cleaning heads 12a and 12b are arranged along a direction that intersects the conveyance direction X of the glass sheets G1 and G2 (direction Y orthogonal to the conveyance direction X).

The cleaning heads 12a and 12b in the first cleaning unit 3a and the cleaning heads 12a and 12b in the second cleaning unit 3b are arranged so that positions of the cleaning heads 12a and 12b in the first cleaning unit 3a and positions of the cleaning heads 12a and 12b in the second cleaning unit 3b in the direction Y orthogonal to the conveyance direction X of the glass sheets G1 and G2 are different from each other. That is, as illustrated in FIG. 8, the cleaning heads 12a and 12b in the second cleaning unit 3b on the downstream side are disposed so as to overlap with gaps of the cleaning heads 12a and 12b in the first cleaning unit 3a on the upstream side, which are arranged in parallel in the Y direction. With such a configuration, the entire surfaces of the glass sheets G1 and G2 which pass through the first cleaning unit 3a and the second cleaning unit 3b are cleaned without leaving an uncleaned part.

The cleaning heads 12a and 12b comprise upper cleaning heads 12a and lower cleaning heads 12b. The upper cleaning heads 12a are configured to clean the upper surfaces of the glass sheets G1 and G2. The lower cleaning heads 12b are configured to clean the lower surfaces of the glass sheets G1 and G2. The upper cleaning heads 12a each comprise an upper cleaning pad 13a which is brought into contact with the upper surfaces of the glass sheets G1 and G2. The lower cleaning heads 12b each comprise a lower cleaning pad 13b which is brought into contact with the lower surfaces of the glass sheets G1 and G2. The upper cleaning pads 13a and the lower cleaning pads 13b are rotated in a state of vertically nipping the glass sheets G1 and G2 therebetween, to thereby perform rubbing cleaning on the upper surface and the lower surface of each of the glass sheets G1 and G2.

The cleaning pads 13a and 13b are each formed of, for example, a foamed resin molded body, a foamed rubber molded body (foam sponge), or a felt-like fiber molded body (felt sponge) so as to have a disc shape (circular plate shape).

The cleaning heads 12a and 12b each comprise a shaft portion 14 which extends along the vertical direction. The shaft portions 14 are driven to rotate by a drive device comprising a power transmission mechanism and a motor. The shaft portions 14 of the cleaning heads 12a and 12b arranged in the first cleaning unit 3a are coupled to each other by a power transmission mechanism such as a gear. Similarly, the shaft portions 14 of the cleaning heads 12a and 12b arranged in the second cleaning unit 3b are coupled to each other by a power transmission mechanism such as a gear. The cleaning heads 12a and 12b in the first cleaning unit 3a and the cleaning heads 12a and 12b in the second cleaning unit 3b are simultaneously driven to rotate through the rotation of the shaft portions 14 by the power transmission mechanism and the motor.

In this embodiment, among the plurality of the cleaning heads 12a and 12b in the first cleaning unit 3a, two cleaning heads 12a and 12b which are located on the outermost side in the direction Y orthogonal to the conveyance direction X of the glass sheets G1 and G2 are brought into contact with the second glass sheet G2 having a large contact length (C2), but are prevented from being brought into contact with the first glass sheet G1 having a small contact length (C1). Thus, the two cleaning heads 12a and 12b become the non-contact portions UT (see FIG. 8 and FIG. 9). In other words, the two cleaning heads 12a and 12b which are located on the outermost side are brought into contact with the second glass sheet G2 having a larger number of cleaning pads to be brought into contact therewith, but are prevented from being brought into contact with the first glass sheet G1 having a smaller number of cleaning pads to be brought into contact therewith. Thus, the two cleaning heads 12a and 12b become the non-contact cleaning pads. Further, the cleaning heads 12a and 12b located on an inner side with respect to the cleaning heads 12a and 12b on the outermost side and all of the cleaning heads 12a and 12b in the second cleaning unit 3b become portions which are brought into contact with both of the first glass sheet G1 and the second glass sheet G2 (contact portions).

The cleaning apparatus 1 comprises the liquid supply portions 7 each configured to supply liquid (second liquid) to the non-contact cleaning pads (non-contact portions UT). The liquid supply portions 7 of this embodiment are located on sides of the cleaning heads 12a and 12b which are located on the outermost side in the first cleaning unit 3a, respectively. Further, the liquid supply portions 7 are located between the upper cleaning heads 12a and the lower cleaning heads 12b. The liquid supply portions 7 each comprise a nozzle configured to jet (spray) the liquid laterally. The nozzles of the liquid supply portions 7 are arranged along the horizontal direction so as to be directed toward the cleaning heads 12a and 12b on the outermost side, respectively. The liquid supply portions 7 each jets the liquid (for example, water) laterally, to thereby supply the liquid to the upper cleaning pads 13a and the lower cleaning pads 13b.

The first cleaning unit 3a and the second cleaning unit 3b of the cleaning apparatus 1 illustrated as an example in this embodiment may be arranged on the upstream side of the cleaning rollers 2a and 2b illustrated as an example in the first embodiment. The configuration is not limited thereto, and the first cleaning unit 3a and the second cleaning unit 3b may be arranged on the downstream side of the cleaning rollers 2a and 2b. Further, the first cleaning unit 3a and the second cleaning unit 3b can be used in place of the cleaning rollers 2a and 2b.

Further, the squeezing rollers 5a and 5b in the first embodiment may be arranged on the upstream side of the first cleaning unit 3a. Similarly, the squeezing rollers 5a and 5b may be arranged also on the downstream side of the second cleaning unit 3b. In addition, the air knives 10a and 10b illustrated as an example in the first embodiment may be arranged on the downstream side of the second cleaning unit 3b. In this embodiment, the glass sheets G1 and G2 may be conveyed by the conveyance rollers 11 illustrated as an example in the first embodiment.

Now, description is made of a method of manufacturing glass sheets G1 and G2 according to the third embodiment. In this embodiment, similarly to the first embodiment, the forming step S1, the cutting step S2, and the end surface processing step S3 are performed, and the glass sheets G1 and G2 are fed to the cleaning apparatus 1. In the cleaning step S4, a predetermined number of first glass sheets G1 are allowed to pass through the first cleaning unit 3a and the second cleaning unit 3b and are sequentially cleaned (first cleaning step).

Specifically, the cleaning pads 13a and 13b are rotated while the upper cleaning pads 13a and the lower cleaning pads 13b in each of the cleaning unit 3a and 3b nip the first glass sheet G1 therebetween, to thereby clean the upper surface and the lower surface of each of the first glass sheets G1. At this time, cleaning liquid (first liquid) is supplied from a nozzle (not shown) to the first glass sheet G1. Thus, the cleaning liquid is supplied also to the cleaning pads 13a and 13b, which are brought into contact with the first glass sheet G1, through the first glass sheet G1. Meanwhile, the liquid (second liquid) from the liquid supply portions 7 is supplied to the cleaning pads 13a and 13b which are prevented from being brought into contact with the first glass sheet G1 (non-contact portions UT).

When cleaning of the first glass sheets G1 is terminated, a predetermined number of second glass sheets G2 are fed to the cleaning apparatus 1 (second cleaning step). In this case, the cleaning pads 13a and 13b are rotated while the upper cleaning pads 13a and the lower cleaning pads 13b in each of the cleaning unit 3a and 3b nip the second glass sheet G2, to thereby clean the upper surface and the lower surface of each of the second glass sheets G2. At this time, the cleaning liquid (first liquid) is supplied from the nozzle (not shown) to the first glass sheet G1. Thus, the cleaning liquid is supplied also to all of the cleaning pads 13a and 13b through the first glass sheet G1. In this case, supply of the liquid from the liquid supply portions 7 may be stopped, or may be continued.

The glass sheets G1 and G2 which has passed through the second cleaning unit 3b passes through the squeezing rollers, and then is conveyed toward the downstream side by the conveyance rollers. After that, similarly to the first embodiment, the drying step S5 is performed to the glass sheets G1 and G2 by the air knives of the drying unit.

According to the method of manufacturing glass sheets G1 and G2 in the embodiment described above, the liquid (second liquid) is supplied from the liquid supply portions 7 to the cleaning pads 13a and 13b which are prevented from being brought into contact with the first glass sheet G1 (non-contact portions UT) during conveyance of the first glass sheets G1 having a small size. In such a manner, fine particles which adhere to the non-contact portions UT can be washed away. As a result, contamination of the cleaning pads 13a and 13b due to fine particles fixed to surfaces of the non-contact cleaning pads (non-contact portions UT) can be prevented. Therefore, occurrence of quality abnormality on the surfaces of the second glass sheets G2 is effectively prevented.

The present invention is not limited to the configurations of the above-mentioned embodiments. In addition, the action and effect of the present invention are not limited to those described above. The present invention may be modified in various forms within the range not departing from the spirit of the present invention.

In the embodiment described above, description is made of the example in which the glass sheets G1 and G2 are cleaned during conveyance inside the cleaning apparatus 1. However, the present invention is not limited to the above-mentioned example. The present invention is applicable not only to the case of conveyance inside the cleaning apparatus 1 but also to a case in which the glass sheets G1 and G2 are conveyed in other steps as long as a step of bringing rollers into contact with the glass sheets G1 and G2 to which liquid adheres is involved.

In the embodiment described above, description is made of the example in which the glass sheets G1 and G2 having a rectangular shape are manufactured. However, a shape of the glass sheets G1 and G2 is not limited to the rectangular shape. The glass sheets G1 and G2 to be manufactured comprise glass sheets G1 and G2 having a circular disc shape or other various kinds of shapes. The method of manufacturing glass sheets G1 and G2 according to the present invention is also applicable to, in addition to a case, for example, of manufacturing glass sheets G1 and G2 having a circular disc shape which are different in diameter, a case of manufacturing glass sheets G1 and G2 having a different shape (for example, glass sheets G1 and G2 having a circular disc shape and glass sheets G1 and G2 having a rectangular shape).

In the present invention, rollers configured to supply liquid to the non-contact portions UT may be suitably set depending on quality required for glass sheets, material of the rollers, and usage of the rollers. As in the embodiment described above, liquid may be supplied to the non-contact portions of only a part of the rollers among the plurality of rollers which are brought into contact with the glass sheets of which liquid adheres to surfaces. Alternatively, liquid may be supplied to the non-contact portions of all of the plurality of the rollers which are brought into contact with the glass sheets of which liquid adheres to surfaces. In the embodiment described above, liquid may be supplied to the non-contact portions of the cleaning rollers 2a and 2b in the cleaning unit 3. Further, liquid may be supplied to the non-contact portions of the conveyance rollers 11 among the conveyance rollers 11 in the drying unit 4 which are arranged on the upstream side with respect to the air knives 10a and 10b.

Specifically, quality abnormality due to fine particles which adhere to the non-contact portions of rollers is more liable to occur at the squeezing rollers 5a and 5b than the cleaning rollers and the conveyance rollers. Therefore, in the embodiment described above, the liquid is supplied to the non-contact portions of the squeezing rollers 5a and 5b in the cleaning unit 3, to thereby prevent the quality abnormality due to fine particles which adhere to the non-contact portions of the rollers. When it is difficult to meet quality required for glass sheets, it is only required that liquid be also supplied to the non-contact portions of the cleaning rollers (brush rollers) 2a and 2b in the cleaning unit 3 and the non-contact portions of the conveyance rollers 11 among the conveyance rollers 11 in the drying unit 4 which are arranged on the upstream side with respect to the air knives 10a and 10b.

In the embodiment described above, description is made of the case in which the liquid is supplied to the squeezing rollers 5a and 5b formed as a pair of upper and lower rollers. However, the present invention is not limited to the above-mentioned configuration. The present invention is applicable also to a single roller which is brought into contact with glass sheets having different sizes. Further, the present invention is not limited to the cleaning pads 13a and 13b as a pair of upper and lower cleaning pads, and is applicable also to single cleaning pads (only upper cleaning pads or lower cleaning pads) which are brought into contact with glass sheets having different sizes.

In the third embodiment described above, description is made of the example in which only the cleaning heads 12a and 12b in the first cleaning unit 3a comprise the non-contact cleaning pads. However, the present invention is not limited to the above-mentioned configuration. In the present invention, when the cleaning heads 12a and 12b in the second cleaning unit 3b comprise the non-contact cleaning pads, the second liquid can be supplied to the non-contact cleaning pads.

In the third embodiment described above, description is made of the example of the cleaning apparatus 1 in which the first cleaning unit 3a and the second cleaning unit 3b each comprising the cleaning heads 12a and 12b are arranged in two rows. However, the present invention is not limited to the above-mentioned configuration. The cleaning apparatus 1 may comprise the cleaning heads 12a and 12b which are arranged in three or more rows.

In the third embodiment described above, the cleaning liquid is supplied to the cleaning pads 13a and 13b through the glass sheet. However, the cleaning liquid (first liquid) may directly supplied to the cleaning pads 13a and 13b, or the cleaning liquid may be supplied to the cleaning pads 13a and 13b through a supply path formed inside the cleaning heads 12a and 12b. Further, in the third embodiment described above, the liquid (second liquid) is supplied from the liquid supply portions 7 to the cleaning pads 13a and 13b which are prevented from being brought into contact with the first glass sheet G1 (non-contact portions UT). However, the liquid (second liquid) may be supplied from a supply path formed inside the cleaning heads 12a and 12b.

REFERENCE SIGNS LIST 1 cleaning apparatus
5a upper roller
5b lower roller
13a upper cleaning pad
13b lower cleaning pad
7 liquid supply portion
C1 contact length
C2 contact length
G1 first glass sheet
G2 second glass sheet
UT non-contact portion

The invention claimed is:

1. A method of manufacturing a glass sheet comprising a step of bringing a glass sheet having a first liquid adhering to a surface thereof into contact with a roller,
wherein the glass sheet comprises:
a first glass sheet; and
a second glass sheet having a contact length with the roller which is larger than that of the first glass sheet, wherein a non-contact portion of the roller is to be brought into contact with the second glass sheet and is prevented from being brought into contact with the first glass sheet, and wherein the step of bringing the glass sheet into contact with the roller comprises a liquid supplying step of, at a time of bringing the first glass sheet into contact with the roller, applying a second liquid to the non-contact portion of the roller.

2. The method of manufacturing a glass sheet according to claim 1, wherein the step of bringing the glass sheet into contact with the roller further comprises a step of cleaning the glass sheet while conveying the glass sheet.

3. The method of manufacturing a glass sheet according to claim 1, wherein the roller comprises a squeezing roller configured to remove the first liquid.

4. The method of manufacturing a glass sheet according to claim 1, wherein the roller comprises an upper roller and a lower roller configured to convey the glass sheet while vertically nipping the glass sheets therebetween.

5. The method of manufacturing a glass sheet according to claim 4, wherein, in the liquid supplying step, the second liquid is dropped from a position above the upper roller.

6. The method of manufacturing a glass sheet according to claim 1,
wherein, in the step of bringing the glass sheet into contact with the roller, the glass sheet is brought into contact with the roller in an inclined posture,
wherein a contact portion of the roller is to be brought into contact with the first glass sheet, and
wherein the non-contact portion is higher than the contact portion due to the inclined posture.

7. The method of manufacturing a glass sheet according to claim 2, wherein the roller comprises a squeezing roller configured to remove the first liquid.

8. The method of manufacturing a glass sheet according to claim 2, wherein the roller comprises an upper roller and a lower roller configured to convey the glass sheet while vertically nipping the glass sheets therebetween.

9. The method of manufacturing a glass sheet according to claim 3, wherein the roller comprises an upper roller and a lower roller configured to convey the glass sheet while vertically nipping the glass sheets therebetween.

10. The method of manufacturing a glass sheet according to claim 7, wherein the roller comprises an upper roller and a lower roller configured to convey the glass sheet while vertically nipping the glass sheets therebetween.

11. The method of manufacturing a glass sheet according to claim 8, wherein, in the liquid supplying step, the second liquid is dropped from a position above the upper roller.

12. The method of manufacturing a glass sheet according to claim 9, wherein, in the liquid supplying step, the second liquid is dropped from a position above the upper roller.

13. The method of manufacturing a glass sheet according to claim 10, wherein, in the liquid supplying step, the second liquid is dropped from a position above the upper roller.

14. The method of manufacturing a glass sheet according to claim 2,
wherein, in the step of bringing the glass sheet into contact with the roller, the glass sheet is brought into contact with the roller in an inclined posture,
wherein a contact portion of the roller is to be brought into contact with the first glass sheet, and
wherein the non-contact portion is higher than the contact portion due to the inclined posture.

15. The method of manufacturing a glass sheet according to claim 3,
wherein, in the step of bringing the glass sheet into contact with the roller, the glass sheet is brought into contact with the roller in an inclined posture,
wherein a contact portion of the roller is to be brought into contact with the first glass sheet, and
wherein the non-contact portion is higher than the contact portion due to the inclined posture.

16. The method of manufacturing a glass sheet according to claim 4,
wherein, in the step of bringing the glass sheet into contact with the roller, the glass sheet is brought into contact with the roller in an inclined posture,
wherein a contact portion of the roller is to be brought into contact with the first glass sheet, and
wherein the non-contact portion is higher than the contact portion due to the inclined posture.

17. The method of manufacturing a glass sheet according to claim 5,
wherein, in the step of bringing the glass sheet into contact with the roller, the glass sheet is brought into contact with the roller in an inclined posture,
wherein a contact portion of the roller is to be brought into contact with the first glass sheet, and
wherein the non-contact portion is higher than the contact portion due to the inclined posture.

18. The method of manufacturing a glass sheet according to claim 7,
wherein, in the step of bringing the glass sheet into contact with the roller, the glass sheet is brought into contact with the roller in an inclined posture,
wherein a contact portion of the roller is to be brought into contact with the first glass sheet, and
wherein the non-contact portion is higher than the contact portion due to the inclined posture.

* * * * *